US007768901B2

(12) United States Patent
Oshima et al.

(10) Patent No.: US 7,768,901 B2
(45) Date of Patent: Aug. 3, 2010

(54) OPTICAL DISC

(75) Inventors: Seiro Oshima, Yamanashi (JP); Toshihiko Takishita, Yamanashi (JP); Eiji Muramatsu, Saitama (JP); Hiroshi Nishiwaki, Saitama (JP)

(73) Assignee: Pioneer Corporation, Tokyo (JP)

( * ) Notice: Subject to any disclaimer, the term of this patent is extended or adjusted under 35 U.S.C. 154(b) by 678 days.

(21) Appl. No.: 11/543,797

(22) Filed: Oct. 6, 2006

(65) Prior Publication Data

US 2007/0081437 A1 Apr. 12, 2007

(30) Foreign Application Priority Data

Oct. 7, 2005 (JP) ............................ 2005-295203

(51) Int. Cl.
*G11B 7/24* (2006.01)

(52) U.S. Cl. .................................................. 369/275.4

(58) Field of Classification Search ............. 369/275.3, 369/275.4
See application file for complete search history.

(56) References Cited

U.S. PATENT DOCUMENTS

| | | | | |
|---|---|---|---|---|
| 6,986,150 | B2 * | 1/2006 | Spruit et al. | 720/718 |
| 7,102,986 | B2 * | 9/2006 | Moribe et al. | 369/275.3 |
| 7,372,801 | B2 * | 5/2008 | Lee et al. | 369/275.4 |
| 7,446,792 | B2 * | 11/2008 | Yamada et al. | 347/224 |
| 2003/0202436 | A1 * | 10/2003 | Tomita et al. | 369/44.26 |
| 2003/0227853 | A1 * | 12/2003 | Kim et al. | 369/59.25 |
| 2005/0195731 | A1 * | 9/2005 | Akiyama et al. | 369/275.4 |
| 2005/0201260 | A1 * | 9/2005 | Kawaguchi et al. | 369/275.4 |
| 2006/0104194 | A1 * | 5/2006 | Ota et al. | 369/275.4 |

* cited by examiner

*Primary Examiner*—Thang V Tran
(74) *Attorney, Agent, or Firm*—Arent Fox LLP

(57) ABSTRACT

A recording layer close to a disc surface is divided into at least two recording areas, a main information recording area D1A and an auxiliary information area (BCA) D1C. Grooves are formed in the main information recording area D1A. Marks M are formed in barcode form representing identifying information in the auxiliary information recording area (BCA) D1C. Track grooves G1 or prepits are formed in the recording layer of the auxiliary information recording area (BCA) D1C and have a depth smaller than that of the groove formed in the main information recording area D1A.

4 Claims, 5 Drawing Sheets

EMBODIMENT

D1

D1A

D1B

M

D1C

A:PORTION WHERE INTERFERENCE IS CAUSED BY GROOVES

B:PORTION WHERE RF SIGNAL CANNOT BE DETECTED

EMBODIMENT

OPTICAL DISC

BACKGROUND OF THE INVENTION

1. Field of the Invention

This invention relates to the structure of an optical disc having an auxiliary information recording area.

The present application claims priority from Japanese Application No. 2005-295203, the disclosure of which is incorporated herein by reference.

2. Description of the Related Art

FIG. 1 illustrates the structure of a conventional optical disc containing an auxiliary information recording area, such as DVD.

The optical disc D shown in FIG. 1 has a record surface containing a main information recording area DA, a control information recording area DB provided next to the inner peripheral end of the main information recording area DA, and an auxiliary information recording area DC provided next to the inner peripheral end of the control information recording area DB.

In the auxiliary information recording area DC which is what is called BCA (Burst Cutting Area), marks M are written in barcode form for identifying information such as an ID number for identifying the individual optical discs D, at the factory prior to shipment.

The identifying information written in the auxiliary information recording area (BCA) DC is read when the mark M is detected by a pickup for recording/reproducing main information in/from the main information recording area DA and control information in/from the control information recording area DB.

Recently, the proposition that the identifying information such as an ID number recorded in the auxiliary information recording area (BCA) DC is used as a copy protection key has been made.

FIG. 2 is a partially enlarged diagram illustrating the record surface of the auxiliary information recording area (BCA) DC of the optical disc D.

In FIG. 2, each of the marks M in barcode form representing the identifying information extends in the radial direction of the optical disc D.

Track grooves G extend in the circumferential direction in the auxiliary information recording area (BCA) DC as well as in the main information recording area DA and the control information recording area DB.

Problems possibly arising in conventional optical discs D structured as described above will be described below.

The track groove G formed in the auxiliary information recording area (BCA) DC of the conventional optical disc D is relatively deep as in the case of the main information recording area DA and the control information recording area DB. Therefore, when the identifying information is read under open tracking conditions from the auxiliary information recording area (BCA) DC, the interference between return light of the laser beam from the track groove G and the land between the track grooves G is increased. The increased interference affects a RF signal reproduced from the auxiliary information recording area (BCA) DC. As a result, the reading of the identifying information recorded in the auxiliary information recording area (BCA) DC may be made impossible.

FIG. 3 illustrates the reproduced signal waveform of the RF signal read from the auxiliary information recording area (BCA) DC in the conventional optical disc D.

As shown in FIG. 3, in the portion A in which the interference is caused by the track groove G, if, for example, a set slice level L is 50%, the occurrence of a portion B in which a RF signal from the auxiliary information recording area (BCA) DC cannot be detected results.

In this event, the identifying information recorded in the auxiliary information recording area (BCA) DC may possibly fail to function as a copy protect key with reliability.

SUMMARY OF THE INVENTION

It is a technical object of the present invention to solve the problem associated with the conventional optical discs as described above.

To attain this object, according to an aspect to the present invention, an optical disc includes a recording layer that is close to a disc surface and is divided into at least two recording areas, a main information recording area having grooves formed therein and an auxiliary information recording area having marks which represent recorded information formed therein. Either grooves or prepits are formed in the recording layer of the auxiliary information recording area and have a depth smaller than that of the grooves formed in the main information recording area.

To attain the above object, according to another aspect of the present invention, an optical disc includes a recording layer that is close to a disc surface and is divided into at least two recording areas, a main information recording area and an auxiliary information area. Grooves are formed in the main information recording area. Marks are formed in the auxiliary information recording area and represent recorded information. Grooves and prepits are not formed in the recording layer of the auxiliary information recording area.

In an exemplar embodiment of the present invention, an optical disc has a recording layer provided parallel to its disc surface and divided into at least two areas, a main information recording area and an auxiliary information recording area. Grooves are formed in the main information recording area. Marks are formed in the auxiliary information recording area and represent recorded information such as identifying information about, for example, an ID number of the optical disc. Either grooves or prepits are formed in the recording layer of the auxiliary information recording area and have a depth smaller than that of the grooves formed in the main information recording area. Alternatively, a groove or prepit is not formed in the recording layer of the auxiliary information recording area.

In the optical disc according to the embodiment, the depth of, for example, a track groove or a prepit formed in an auxiliary information recording area is smaller than that a track groove or a prepit formed in a main information recording area. Alternatively, a track groove or a prepit is not formed in the auxiliary information recording area. Thereby, the effects of, for example, interference from the grooves and lands in the auxiliary information recording area on a reproduced RF signal when tracking is open are reduced or eliminated. This makes it possible to reliably read identifying information recorded in the auxiliary information recording area (BCA) D1C.

In consequence, for example, even when the identifying information recorded in the auxiliary information recording area is used as a copy protect key, the copy protect function is activated with reliability.

In the above embodiment, when the marks representing the recoded information are marks in barcode form representing identifying information for identifying the optical disc, the portions of the recording layer formed of, for example, an azo dye recording material in which the marks in barcode form are formed, and the portions in which the mark is not formed differ in reflectance from each other. Thus, because of the difference in reflectance, the identifying information represented by the marks is read.

In the above embodiment, further, when a wavelength 660 nm of a laser beam is used for recording/reproducing an optical disc such as for DVD, the depth of each of the grooves or prepits formed in the recording layer of the auxiliary information recording area is set at less than 65 nm. Thereby, reliable reading of the identifying information recorded in the auxiliary information recording area is made possible.

In the above embodiment, further, when a wavelength 405 nm of a laser beam is used for recording/reproducing an optical disc such as for BD, the depth of each of the grooves or prepits formed in the recording layer of the auxiliary information recording area is set at less than 40 nm. Thereby, reliable reading of the identifying information recorded in the auxiliary information recording area is made possible.

These and other objects and features of the present invention will become more apparent from the following detailed description with reference to the accompanying drawings.

DETAILED DESCRIPTION OF THE PREFERRED EMBODIMENT

Figure 1:
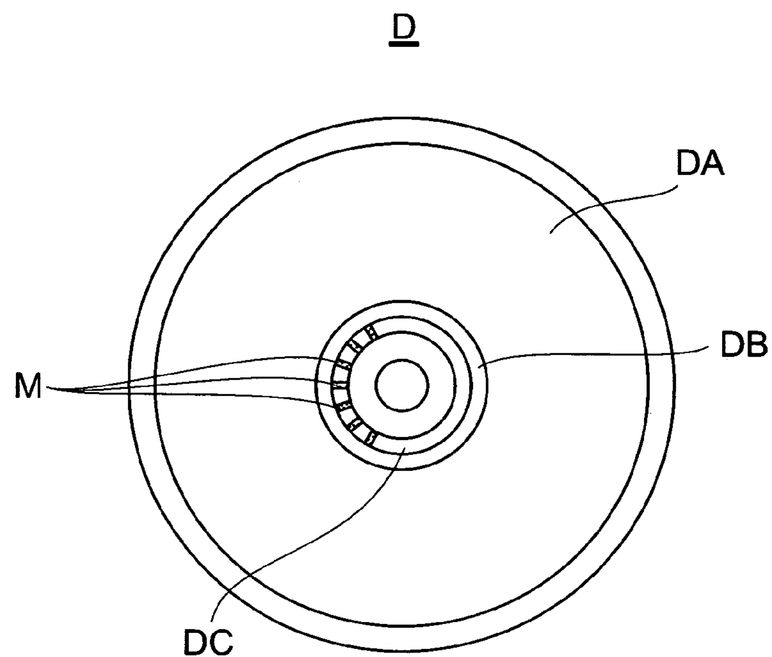
FIG. 1 is a plan view illustrating a conventional optical disc.
Figure 2:
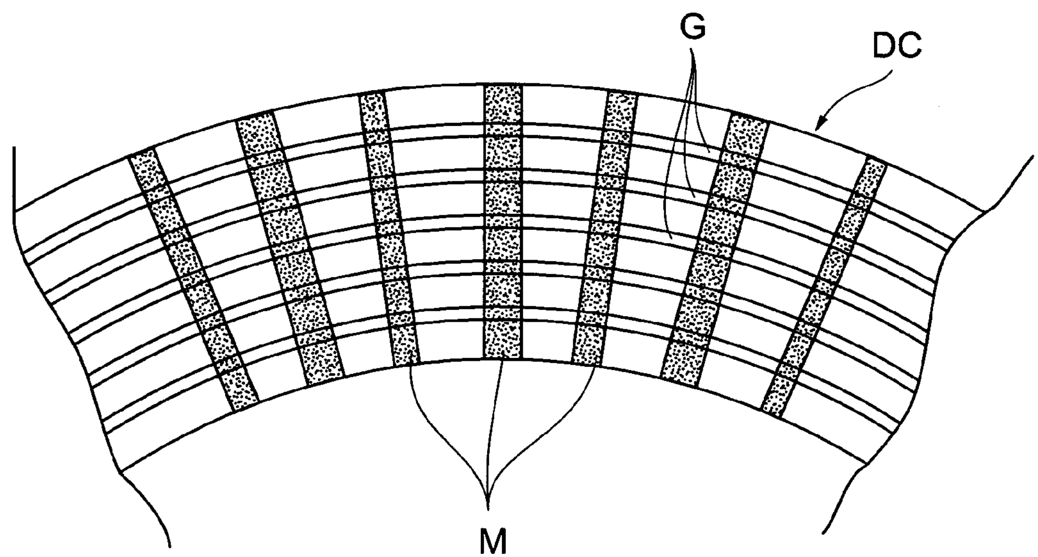
FIG. 2 is a partially enlarged view illustrating an auxiliary information recording area of the conventional optical disc.
Figure 3:
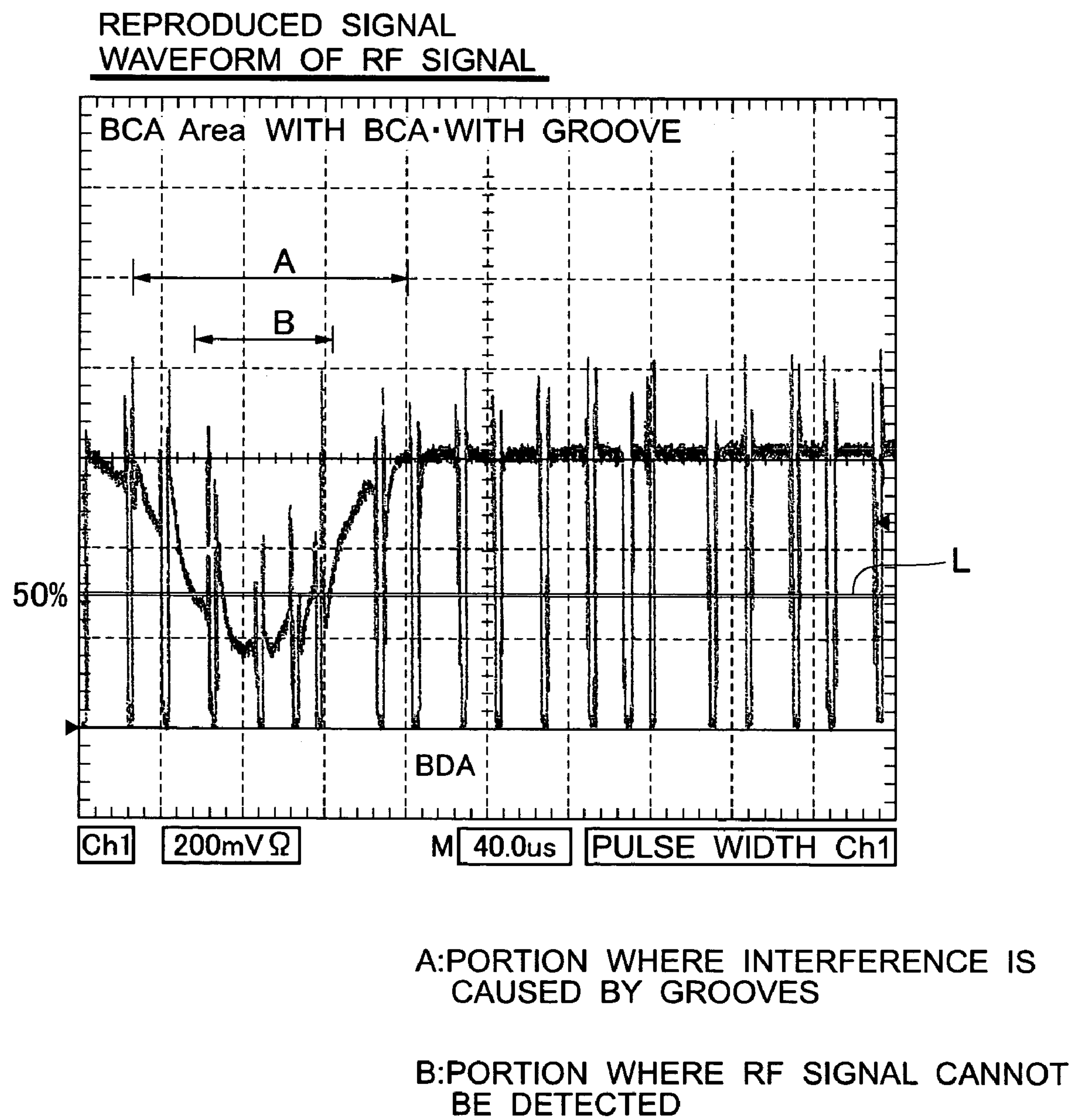
FIG. 3 is a graph showing a reproduced signal waveform of a RF signal in the conventional optical disc.
Figure 4:
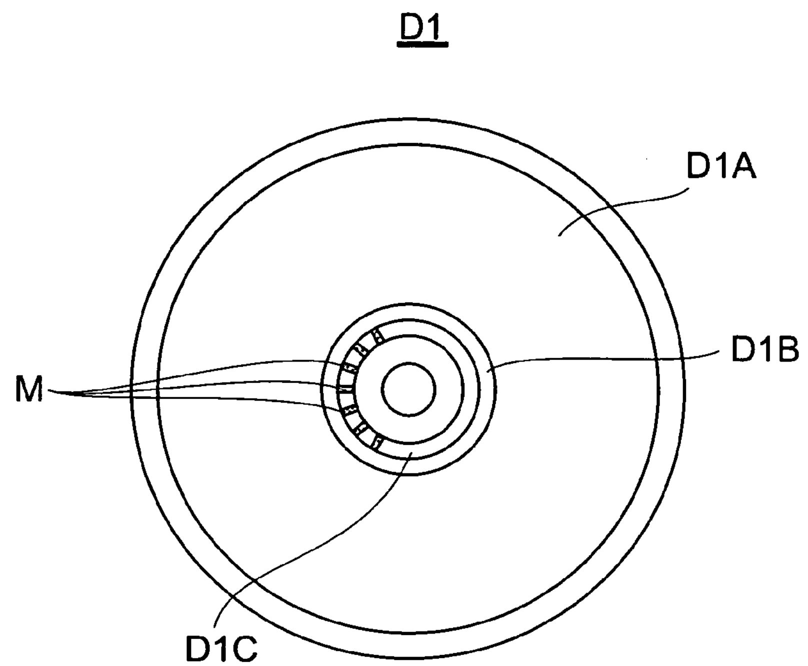
FIG. 4 is a plan view illustrating an optical disc in an embodiment according to the present invention.
Figure 5:
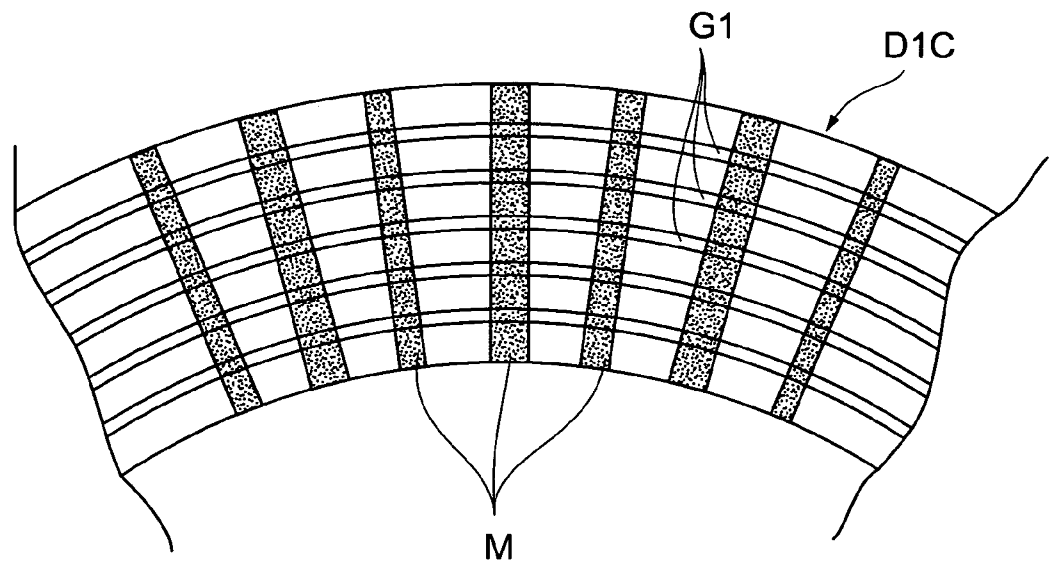
FIG. 5 is a partially enlarged view illustrating an auxiliary information area of the optical disc in the embodiment.

FIGS. 4 and 5 illustrate an embodiment of an optical disc according to the present invention. FIG. 4 is a plan view of the record surface of the optical disc in the embodiment. FIG. 5 is an enlarged view of a part of the record surface of an auxiliary information recording area (BCA) in the embodiment.

In FIG. 4, the optical disc D1 has, as in the case of the conventional optical disc, a record surface containing a main information recording area D1A, a control information recording area D1B provided next to the inner peripheral end of the main information recording area D1A, and an auxiliary information recording area (BCA) D1C provided next to the inner peripheral end of the control information recording area D1B.

In the auxiliary information recording area D1C, as shown in FIG. 5, marks M are written in barcode form for identifying information such as an ID number for identifying the individual optical discs D1, at the factory prior to shipment, as in the case of the conventional optical disc. Each of the marks M extends across tracks in the radial direction of the optical disc D1.

For example, in the case of a write-once optical disc having a recording layer formed of an azo dye recording material, a recording device or the like is used at the factory to write the marks M in barcode form representing information on an ID number differing from disc to disc and the like on the record surface of the auxiliary information recording area (BCA) D1C.

After recoding layers of the main information recording area D1A and the control information recording area D1B are formed, the recording device irradiates the recording layer of the auxiliary information recording area (BCA) D1C with a laser beam in synchronization with the rotation of the optical disc D1, to generate marks M in barcode form representing the identifying information about an ID number and the like in the recording layer of the auxiliary information recording area (BCA) D1C.

At this point, the portions of the recording layer of the auxiliary information recording area (BCA) D1C in which the marks M are formed come into a low reflectance state, and the portions in which the mark M is not formed (a portion between the marks M) are in a high reflectance state. Therefore, when the recording is reproduced from the main information recording area D1A and the control information recording area D1B, a pickup reads the identifying information represented by the mark M by the use of the difference in reflectance.

Track grooves G1 extend in the auxiliary information recording area (BCA) D1C in the circumferential direction of the optical disc D1.

The depth of the track groove G1 in the auxiliary information recording area D1 is shallower than that of track grooves (not shown) formed in the main information recording area D1A and the control information recording area D1B.

Regarding levels of a RF signal which is detected from a disc having grooves when tracking is off (i.e., a level of a sum signal from a detector divided into two in the track direction), the eccentricity in RC (Radial Contrast signal) gives rise to bright and dark regions in the return light under the effects of the grooves and lands between the adjacent grooves, which in turn has an effect on the reading of the identifying information from the auxiliary information recording area D1C.

In order to reduce interference from the track groove G1, a desirable RC is less than 0.3.

In the case of a DVD-R disc, assuming that the depth of a track groove in the main information recording area D1A and the control information recording area D1B is about 170 nm, a wavelength $\lambda$ of a recording/reproducing laser beam is 660 nm, and a refractive index n of the substrate is 1.6, a desirable depth d of the track groove G1 is less than 65 nm in order to obtain RC of less than 0.3.

In the case of a BD-R disc, assuming that the depth of a track groove in the main information recording area D1A and the control information recording area D1B is about 40 nm<d1<50 nm, a wavelength $\lambda$ of a recording/reproducing laser beam is 405 nm, and a refractive index n of the substrate is 1.6, a desirable depth d of the track groove G1 is less than 40 nm in order to obtain RC of less than 0.3.

RC is approximated by the following equation:

$$RC=|\cos(4\pi nd/\lambda)\cdot\sin(2\pi nd/\lambda)|$$

Necessary conditions for obtaining RC<0.3 from this equation are:

When $\lambda$=660 nm (in the case of DVD), d<65 nm, and

When $\lambda$=405 nm (in the case of BD), d<40 nm.

The above results are obtained when the disc surface of the optical disc D1 is not coated with dye. When the disc surface is coated with dye, the track groove G1 has a smaller depth d.

Figure 6:
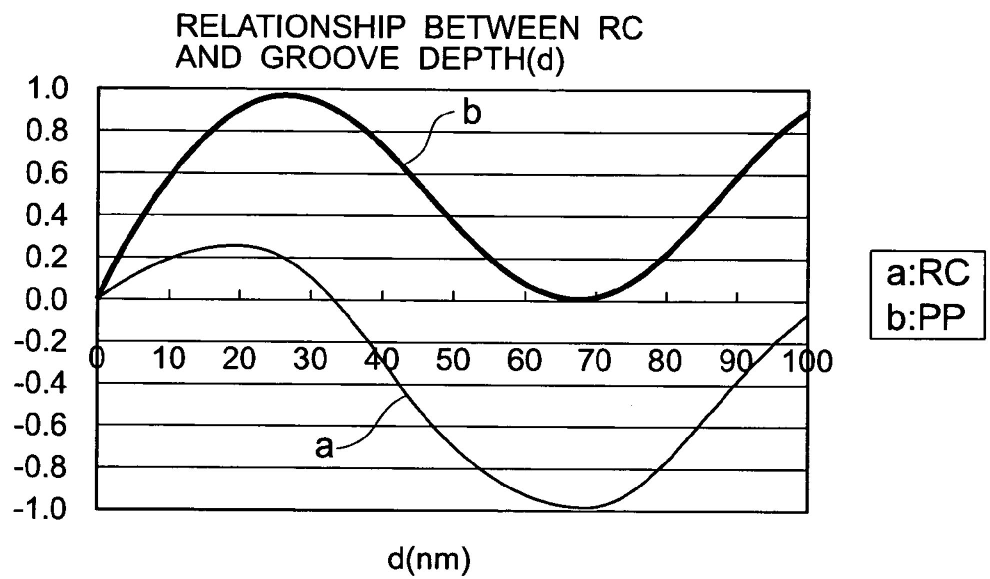
FIG. 6 is a graph showing the relationship between RC and the depth of a groove in the optical disc.

FIG. 6 is a graph showing the relationship between RC and values of the depth d of the track groove G1 when a recording/reproducing laser beam with a wavelength $\lambda$=405 nm is used in the above equation for RC. In FIG. 6, a graph a shows the RC amplitude on the basis of the calculated value when dye is not used, and a graph b shows the amplitude of PP (push-pull signal) indicative of a level of a difference signal of a detector divided into two in the track direction on the basis of the calculated value when dye is not used.

In FIG. 6, (+) side of RC shows the groove dark state and (−) side of RC shows the groove bright state.

It is seen from FIG. 6 that the necessary condition for obtaining an absolute value of less than 0.3 for RC is that the depth of the track groove G1 in the auxiliary information recording area (BCA) D1C is less than 40 nm.

Figure 7:
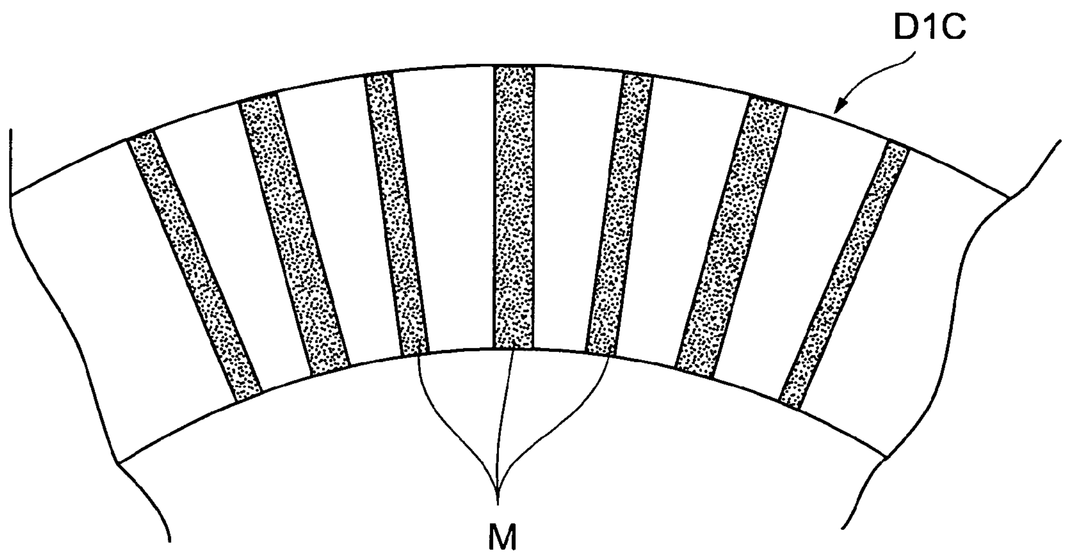
FIG. 7 is a partially enlarged view illustrating an auxiliary information area of a modified example of the optical disc in the embodiment.

In order to reduce the interference from the track groove G1 for reliable detection of the identifying information (reading of the marks M) from the auxiliary information recording area (BCA) D1C, what is required is for the depth of the track groove G1 to be less than 65 nm when a wavelength $\lambda$ of the laser beam is equal to 660 nm (in the case of DVD) and to be less than 40 nm when a wavelength $\lambda$ is equal to 405 nm (in the case of BD). Accordingly, as shown in FIG. 7, the marks M alone may be formed and the track groove may not be formed in the auxiliary information recording area (BCA) D1C.

Figure 8:
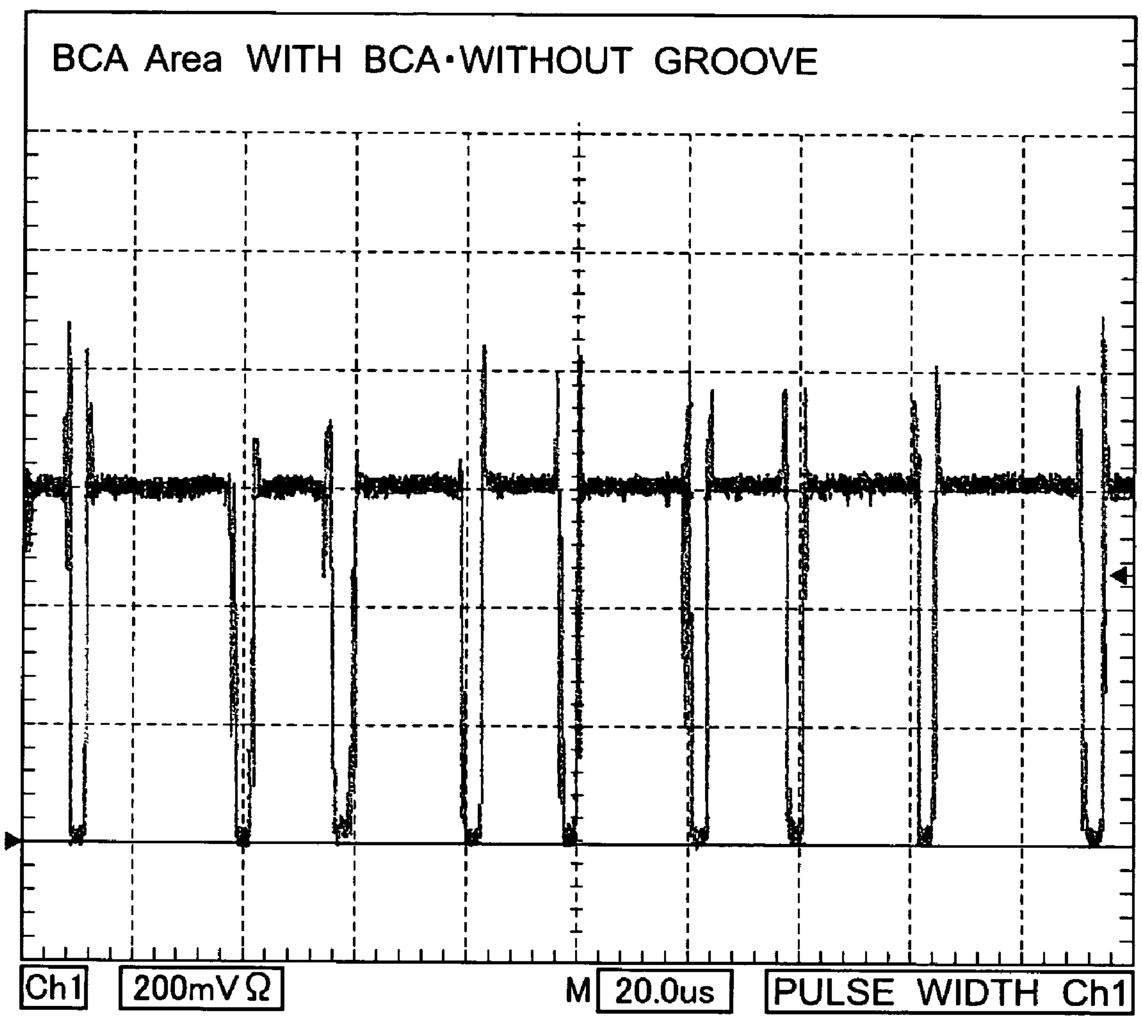
FIG. 8 is a graph showing a reproduced signal waveform of a RF signal in the optical disc of the modified example.

FIG. 8 shows the reproduced signal waveform of a RF signal when the track groove is not formed in the auxiliary information recording area (BCA) D1C.

It is seen from FIG. 8 that the identifying signal is reliably read from the auxiliary information recording area (BCA) D1C when the track groove is not formed in the auxiliary information recording area (BCA) D1C.

The foregoing has described the case when the track groove is formed in the auxiliary information recording area (BCA) D1C, and the same holds true in the case when a track prepit or an address prepit is formed in the auxiliary information recording area (BCA) D1C. In this case, the prepit formed in the auxiliary information recording area (BCA) D1C may have a smaller depth (e.g., a depth of less than 65 nm when a recording/reproducing laser beam wavelength $\lambda$=660 nm and a depth of less than 40 nm when wavelength $\lambda$=405 nm) than that of a groove or prepit formed in the main information recording area D1A and the control information recording area D1B. Alternatively, the prepit may not be formed in the auxiliary information recording area (BCA) D1C.

As described above, the depth of the track groove G1 or the prepit formed in the auxiliary information recording area (BCA) D1C is set smaller than the depth of the track groove or the prepit formed in the main information recording area D1A and the control information recording area D1B. Alternatively, the track groove G1 and the prepit are not formed in the auxiliary information recording area (BCA) D1C. In this way, interference from the grooves and lands in the auxiliary information recording area (BCA) D1C and the like, which affect a reproduced RF signal when tracking is open, are reduced or eliminated. This makes it possible to reliably read identifying information recorded in the auxiliary information recording area (BCA) D1C.

By thus reliably reading the identifying information recorded in the auxiliary information recording area (BCA) D1C, even when, for example, the identifying information recorded in the auxiliary information recording area (BCA) D1C is used as a copy protect key, the identifying information performs the function with reliability.

The foregoing optical disc according to the present invention is applicable to a DRAW-type, write once-type or read only-type optical disc, specifically, to any optical disc having an auxiliary information recording area (BCA) such as DVD, DVD-R, DVD-RW, BD, BD-R, BD-RE.

A basic concept of the optical disc in the embodiment is that an optical disc has a recording layer that is provided parallel to its disc surface and divided into at least two areas, a main information recording area and an auxiliary information recording area, grooves that are formed in the main information recording area, and marks that are formed in the auxiliary information recording area and represent recorded information such as identifying information about, for example, an ID number of the optical disc, in which either grooves or prepits are formed in the recording layer of the auxiliary information recording area and have a depth smaller than that of the grooves formed in the main information recording area, or alternatively a groove or prepit is not formed in the recording layer of the auxiliary information recording area.

In the optical disc according to the embodiment based on the above basic concept, the depth of, for example, a track groove or a prepit formed in an auxiliary information recording area is smaller than that, for example, a track groove or a prepit formed in a main information recording area. Alternatively, a track groove or a prepit is not formed in the auxiliary information recording area. Thereby, the effects of, for example, interference from the grooves and lands in the auxiliary information recording area on a reproduced RF signal when tracking is open are reduced or eliminated. As a result, the reading of identifying information recorded in the auxiliary information recording area is performed with reliability.

In consequence, for example, even when the identifying information recorded in the auxiliary information recording area is used as a copy protect key, the copy protect function is activated with reliability.

The terms and description used herein are set forth by way of illustration only and are not meant as limitations. Those skilled in the art will recognize that numerous variations are possible within the spirit and scope of the invention as defined in the following claims.

What is claimed is:

1. An optical disc, comprising a recording layer that is close to a disc surface and is divided into at least two recording areas, a main information recording area having grooves formed therein and an auxiliary information recording area having marks which represent recorded information formed therein, wherein either grooves or prepits are formed in the recording layer of the auxiliary information recording area and have a depth d which is smaller than that of the grooves formed in the main information recording area and which is determined by having a radial control signal (RC) of less than 0.3, wherein the RC is determined by the equation:

$$RC=|\cos(4\pi nd/\lambda)\cdot\sin(2\pi nd/\lambda)|,$$

wherein n is a refractive index of a substrate of the optical disc, and $\lambda$ is a wavelength of a recording/reproducing laser beam.

2. An optical disc according to claim 1, wherein the mark is marks in barcode form representing identifying information for identifying the optical disc.

3. An optical disc according to claim 1, wherein the depth d of each of the grooves or prepits formed in the recording layer of the auxiliary information recording area is set at less than 65 nm when a wavelength of a laser beam used for recording/reproducing the optical disc is 660 nm.

4. An optical disc according to claim 1, wherein the depth d of each of the grooves or prepits formed in the recording layer of the auxiliary information recording area is set at less than 40 nm when a wavelength of a laser beam used for recording/reproducing the optical disc is 405 nm.

* * * * *